United States Patent
Chang et al.

(10) Patent No.: US 7,440,867 B2
(45) Date of Patent: Oct. 21, 2008

(54) SYSTEM AND METHOD FOR MEASURING WORKPIECES

(75) Inventors: Chih-Kuang Chang, Guangdong (CN); Hua-Wei Yang, Guangdong (CN); Li Jiang, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 138 days.

(21) Appl. No.: 11/309,467

(22) Filed: Aug. 10, 2006

(65) Prior Publication Data

US 2007/0078804 A1 Apr. 5, 2007

(30) Foreign Application Priority Data

Sep. 26, 2005 (CN) .................... 2005 1 0100070

(51) Int. Cl.
  *G06F 9/44* (2006.01)
  *G06F 19/00* (2006.01)
(52) U.S. Cl. ................................ 702/123
(58) Field of Classification Search ........... 702/123
  See application file for complete search history.

(56) References Cited

U.S. PATENT DOCUMENTS 5,875,331 A * 2/1999 Lindsey ............... 717/108
6,141,012 A * 10/2000 Bollman et al. ......... 345/418
6,141,014 A * 10/2000 Endo et al. ............. 345/427
6,298,474 B1 * 10/2001 Blowers et al. ......... 717/104
6,708,138 B1 * 3/2004 Zhang et al. ........... 702/182
6,931,633 B1 * 8/2005 Vazquez et al. ......... 717/131
7,032,210 B2   4/2006 Alloing et al.
2006/0248540 A1 * 11/2006 Stemer et al. .......... 719/321

FOREIGN PATENT DOCUMENTS

CN     1529466 A    9/2004
CN     1591326 A    3/2005
TW     535082       6/2003

OTHER PUBLICATIONS

Le Yi-zhou, "The Use of Win Runner in Testing Network Management", Telecommunications Network Technology, issued 5th edition, Oct. 2002, p. 26-30, Motorola, Inc, China.

* cited by examiner

*Primary Examiner*—Michael P. Nghiem
*Assistant Examiner*—Cindy H Khuu
(74) *Attorney, Agent, or Firm*—Winston Hsu

(57) ABSTRACT

An exemplary method for measuring workpieces is disclosed. The method includes the steps of: measuring a workpiece; recording the measuring procedures of the workpiece; generating procedure codes according to the measuring procedures; storing the procedure codes in a program file; generating a measuring program by compiling the procedure codes and saving corresponding procedure commands of the compiled program file in a measuring program command package; and measuring a same type of workpieces by executing the procedure commands of the measuring program command package. By utilizing the present invention, the same type of workpieces can be measured automatically, measuring time can be reduced, and measuring efficiency can be enhanced.

17 Claims, 5 Drawing Sheets

SYSTEM AND METHOD FOR MEASURING WORKPIECES

FIELD OF INVENTION

The present invention relates to a system and method for measuring workpieces.

DESCRIPTION OF RELATED ART

In modern manufacturing processes, it is generally desirable to have as much control and automation as possible. In order to improve the manufacturing processes as much as possible, and to provide as great a control as possible, large amounts of information are collected and analyzed that allow for a refinement of the process and improving quality control.

For example, before a type of workpiece is mass produced, at least one sample of the type of workpiece needs to be measured manually in order to inspect the quality of the workpiece sample—an important factor for keeping the ability of enterprise competitive. Then, an operator collects the measuring procedures, and analyzes the sizes of the workpiece.

What is needed, therefore, is a system and method of generating measuring programs for measuring workpieces intelligently.

SUMMARY OF THE INVENTION

A system for measuring workpieces is provided in accordance with a preferred embodiment. The system typically includes a procedure code generating module, a program compilation module and a program execution module. The programming code generating module is configured for recording measuring procedures generated by that an image measuring machine measures a workpiece, for generating corresponding procedure codes according to the measuring procedures, and for storing the procedure codes in a program file. The program compilation module is configured for storing the program file in a text file, converting the text file into procedure commands, and storing the procedure commands in a measuring program command package. The program execution module is configured for measuring a same type of workpieces by executing the procedure commands of the measuring program command package.

A method for measuring workpieces is disclosed. The method includes the steps of: measuring a workpiece; recording the measuring procedures of the workpiece; generating procedure codes according to the measuring procedures; storing the procedure codes in a program file; generating a measuring program by compiling the procedure codes and saving corresponding procedure commands of the compiled program file in a measuring program command package; and measuring a same type of workpieces by executing the procedure commands of the measuring program command package.

Other systems, methods, features, and advantages of the present invention will be or become apparent to one with skill in the art upon examination of the following drawings and detailed description.

DETAILED DESCRIPTION

Figure 1:
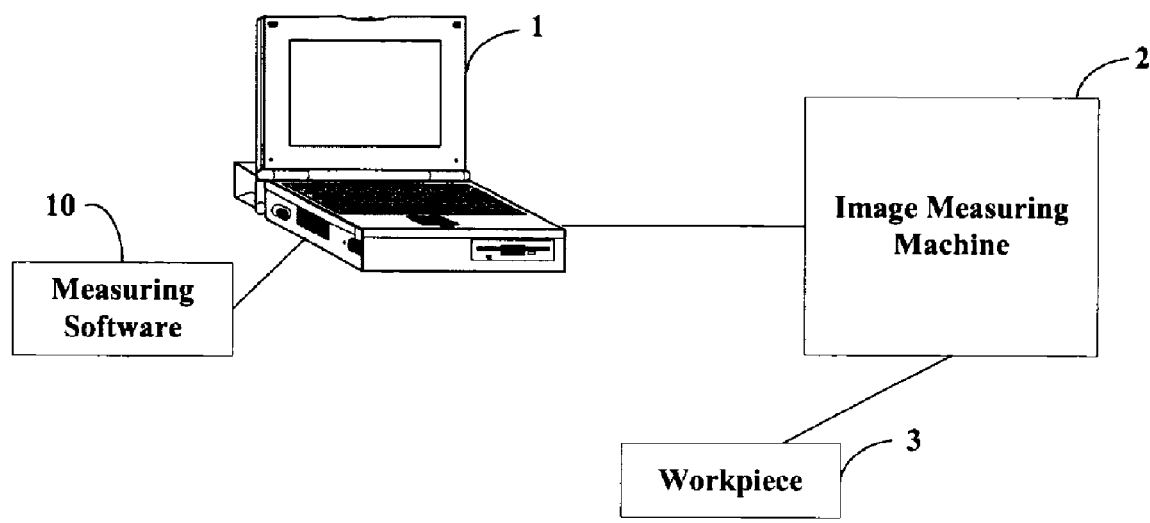
FIG. 1 is a schematic diagram illustrating a hardware configuration of a system for measuring workpieces, in accordance with one preferred embodiment.

FIG. 1 is a schematic diagram illustrating a hardware configuration of a system for measuring workpieces (hereinafter, "the system"), in accordance with one preferred embodiment. The hardware configuration of the system typically includes a computer 1, an image measuring machine 2, and at least one workpiece 3. The computer 1 may include a measuring software 10 that is configured for measuring the length and shape of the workpiece 3. The computer 1 is connected with the image measuring machine 2, and may be a desktop computer, a laptop computer, a notebook, or any other suitable type of computing device.

Figure 2:
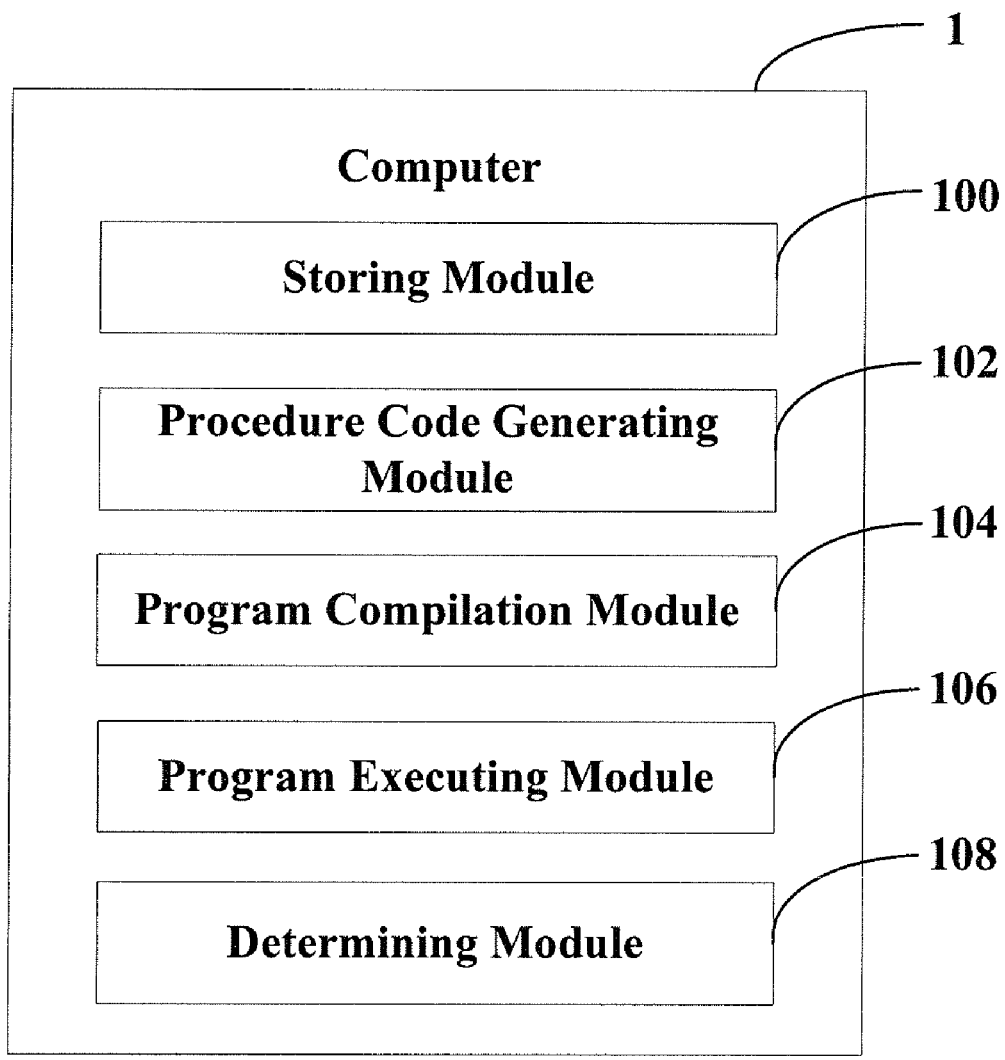
FIG. 2 is a schematic diagram of software function modules of the computer of FIG. 1.

FIG. 2 is a schematic diagram of software function modules of the computer 1. The computer 1 mainly includes a storing module 100, a procedure code generating module 102, a program compilation module 104, a program executing module 106, and a determining module 108.

The storing module 100 is configured for storing command parameters and files generated while generating a measuring program. The procedure code generating module 102 is configured for recording measuring procedures. The measuring procedures are generated when the image measuring machine 2 completes a full measuring cycle on the workpiece 3 by utilizing the measuring software 10.

The procedure code generating module 102 is further configured for generating corresponding procedure codes according to the measuring procedures. The storing module 100 stores the procedure codes in a program file. The measuring procedures includes a position of the image measuring machine 2, a type of a light source, a luminous flux of the light source, a running speed of the image measuring machine 2, and other related operational information. The related operational information mainly includes a find edge tool, a focus tool, measuring elements, constructive elements, and coordinates.

The program compilation module 104 is configured for compiling the procedure codes, and for generating a measuring program according to the procedure codes. That is, the storing module 100 stores the program file in a text file, the program compilation module 104 reads all the procedures of the text file, converts the text file into corresponding procedure commands, and the storing module 100 stores the procedure commands in a measuring program command package. The text file is a transitional file with correct syntax readable by the program compilation module 104. The procedure commands include measuring commands, find edge tool commands, conditional statement commands, loop statement commands, light commands, statement assigning command, and command fulfillment.

The program executing module 106 is configured for executing all the procedure commands in the measuring program command package, triggering an event, and transmitting the procedure commands to the measuring software 10 for measuring a same type of workpiece. The event is configured for controlling the running state of the measuring software 10 and the image measuring machine 2.

The determining module 108 is configured for determining whether the command parameters are accurate, and determining whether the procedure code generating module 102 finishes recording the procedure codes. The determining module 108 is further configured for determining whether procedures of the text file complies syntax, and determining whether the program compilation module 104 reads all the procedures of the text file.

Figure 3:
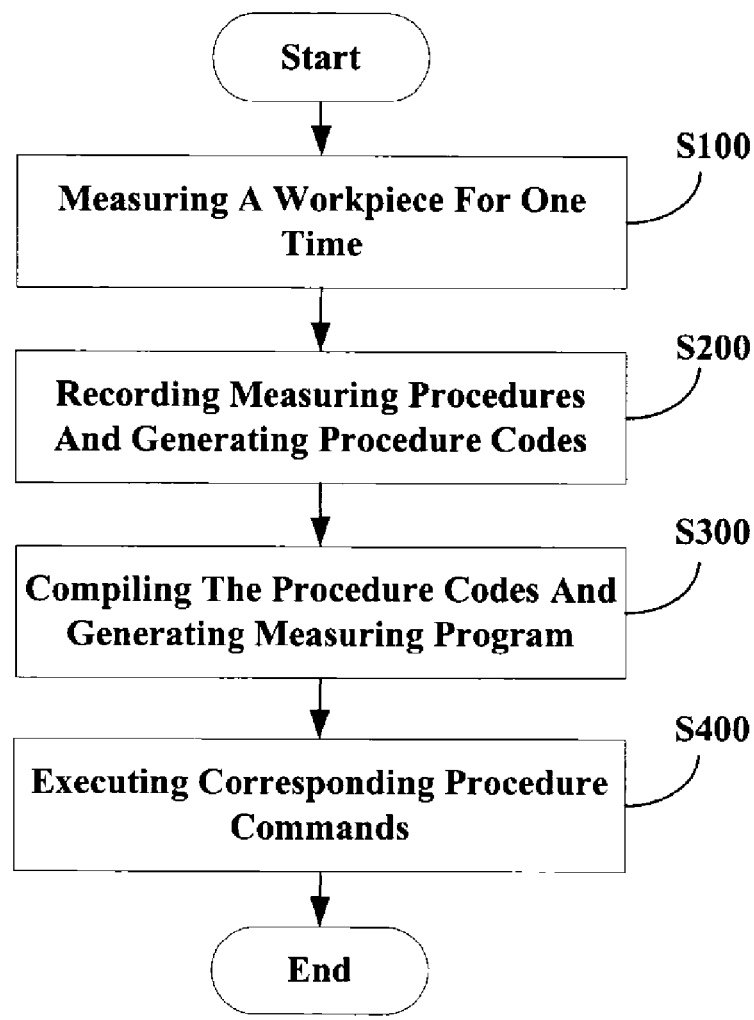
FIG. 3 is a flowchart of a preferred method for measuring workpieces in accordance with one preferred embodiment.

FIG. 3 is a flowchart of a preferred method for measuring workpieces. In step S100, the image measuring machine 2 is operated to complete the full measuring cycle on the workpiece 3 by utilizing the measuring software 10.

In step S200, the procedure code generating module 102 records the measuring procedures generated during the full measuring cycle, generates the procedure codes, and stores the procedure codes in the program file. The measuring procedures includes the position of the image measuring machine 2, the type of the light source, the luminous flux of the light, running speeds of the measuring software 10, the image measuring machine 2, and other related operational information. The related operational information mainly includes a find edge tool, a focus tool, measuring elements, constructive elements, and coordinates.

In step S300, the program compilation module 104 complies procedure codes, and generates the measuring program according to the procedure codes. That is, the storing module 100 stores the program file in the text file, the program compilation module 104 converts the text file into corresponding procedure commands, and the storing module 100 stores the procedure commands in the measuring program command package. The text file is the transitional file with correct syntax readable by the program compilation module 104.

In step S400, the program executing module 106 executes all the procedure commands in the measuring program command package, triggers events, and transmits the procedure commands to the measuring software 10 for measuring the same type of workpiece. The event is configured for controlling the running state of the measuring software 10 and the image measuring machine 2.

Figure 4:
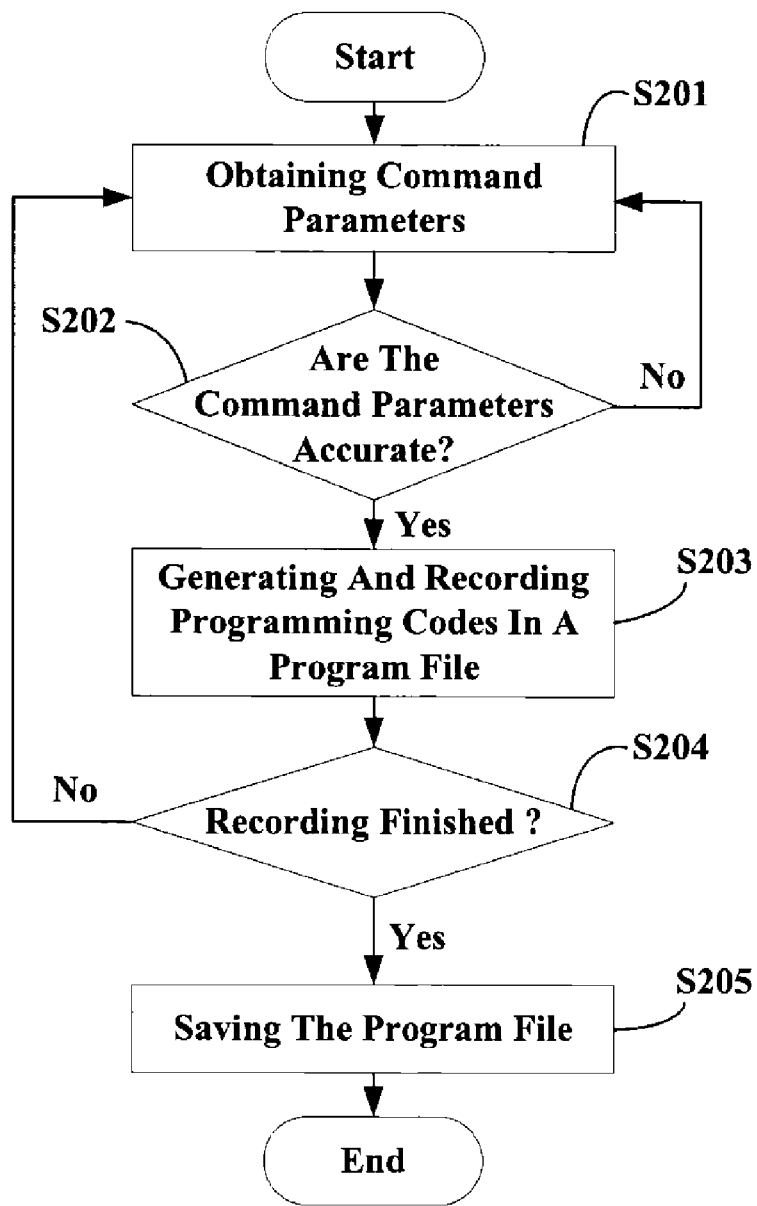
FIG. 4 is one step of FIG. 3 in detail, namely generating procedure codes.

FIG. 4 is a flowchart of step S200 of FIG. 3 in detail, namely generating procedure codes. In step S201, the programming code generating module 102 first records the related measuring procedures that is generated during the manual operation and then obtains command parameters. The command parameters include parameters of positions of the image measuring machine 2, the type of the light source, the illumination of the light, running speed, and related operational information.

In step S202, the determining module 108 determines whether the command parameters are accurate. In step S203, if the command parameters are accurate, the procedure code generating module 102 generates corresponding procedure codes according to the command parameters and saves the procedure codes in the program file; if the command parameters are inaccurate, the process returns to the step S201.

In step S204, the determining module 108 determines whether the procedure code generating module 102 has finished recording the procedure codes. In step S205, the storing module 100 stores the program file if the procedure code generating module 102 has finished recording the procedure codes. The process returns to the step S201 if the procedure code generating module 102 has not finished recording the procedure codes.

Figure 5:
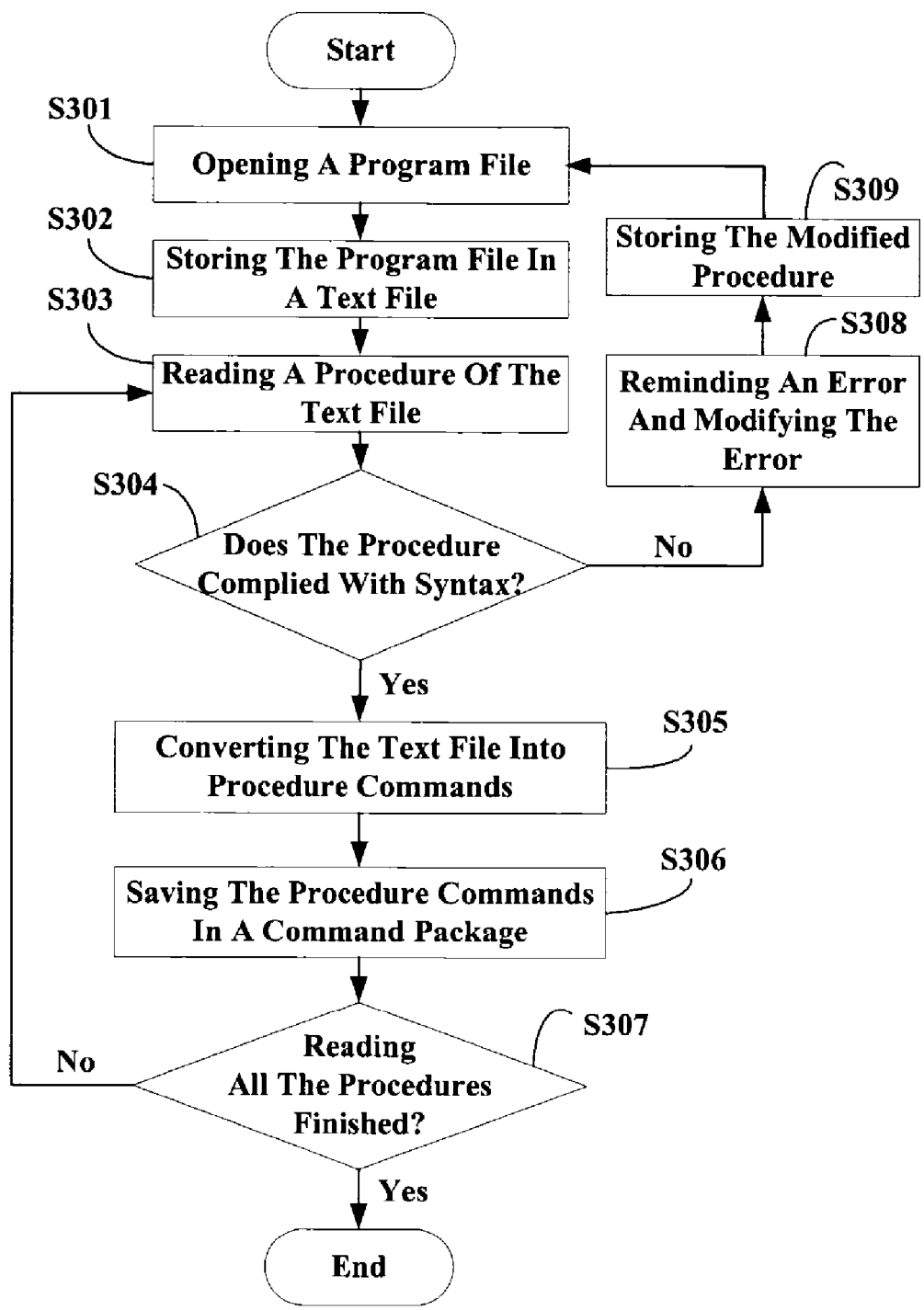
FIG. 5 is one step of FIG. 3 in detail, namely editing commands.

FIG. 5 is a flowchart of step S300 of FIG. 3 in detail, namely editing commands. In step S301, the program file in FIG. 4 is opened. In step S302, the storing module 100 stores the program file as character strings in the text file.

In step S303, the program compilation module 104 reads one procedure of the text file. In step S304, the determining module 108 determines whether the procedure of the text file complies syntax.

In step S305, the program compilation module 104 converts the text file into procedure commands if the procedure complies syntax. In step S306, the storing module 100 stores the procedure commands in the measuring program command package.

In step S307, the determining module 108 determines whether the program compilation module 104 has finished reading all the procedures of the text file. If the program compilation module 104 finishes reading all the procedures in the text file, the process ends. If the program compilation module 104 has not finished reading all the procedures of the text file, the process returns to the step S303.

In step S308, the program compilation module 104 reminds a user the procedure has error, and the user modifies the error if the procedure of the text file does not complies syntax (shown in step S304). In step S309, the storing module 100 stores the modified procedure, and the process returns to the step S309.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for measuring workpieces, the system comprising:

a programming code generating module configured for recording measuring procedures generated when an image measuring machine measures a workpiece, for obtaining command parameters of the measuring procedures and generating corresponding procedure codes based on the command parameters, and for storing the procedure codes in a program file;

a determining module configured for determining whether the command parameters are accurate, and whether the storing of the procedure codes by the programming code generating module has been finished;

a program compilation module configured for storing the program file in a text file, converting the text file into procedure commands, and storing the procedure commands in a measuring program command package; and a program execution module configured for measuring a same type of workpiece by executing the procedure commands of the measuring program command package.

2. The system according to claim 1, wherein the determining module is further configured for determining whether procedures of the text file comply in syntax, and whether the program compilation module reads all the procedures of the text file.

3. The system according to claim 1, further comprising a storing module for storing the command parameters and files generated during measurement of the workpiece.

4. The system according to claim 1, wherein the program execution module executes the procedure commands of the measuring program command package, triggers an event, and transmits the procedure commands to measure the same type of workpiece.

5. The system according to claim 4, wherein the event is configured for controlling the running of the image measuring machine, and monitoring the running state of the image measuring machine.

6. The system according to claim 1, wherein the measuring procedures comprise a find edge tool, a focus tool, measuring elements, and constructive elements and coordinates.

7. A method for measuring workpieces, the method comprising the steps of:
   measuring a workpiece;
   recording measuring procedures of the workpiece;
   obtaining command parameters of the measuring procedures;
   determining whether the command parameters are accurate;
   generating procedure codes based on the command parameters and storing the procedure codes in a program file if the command parameters are accurate;
   determining whether the storing of the procedure codes has been finished;
   saving the program file if the storing of the procedure codes has been finished;
   returning to the step of obtaining the command parameters of the measuring procedures if the storing of the procedure codes has not been finished;
   generating a measuring program by compiling the procedure codes in the program file and saving corresponding procedure commands of the compiled program file in a measuring program command package; and
   measuring a same type of workpiece by executing the procedure commands of the measuring program command package.

8. The method according to claim 7, wherein the measuring procedures comprise a find edge tool, a focus tool, measuring elements, and constructive elements and coordinates.

9. The method according to claim 7, further comprising the step of:
   returning to the step of obtaining the command parameters if the command parameters are inaccurate.

10. The method according to claim 7, wherein the step of generating a measuring program comprises steps of:
   opening the program file;
   saving the program file in a text file;
   reading a procedure of the text file;
   determining whether the procedure of the text file complies in syntax;
   converting the text file into corresponding procedure commands if the procedure complies in syntax;
   saving the procedure commands in the measuring program command package as the measuring program;
   determining whether all the procedures of the text file have been read;
   ending the process if all the procedures of the text file have been read; and
   returning to the step of reading a procedure of the text file if all the procedures of the text file have not been read.

11. The method according to claim 10, further comprising steps of:
   reminding an error and modifying the error if the procedure does not comply in syntax; and
   saving the procedure in the text file, and returning to the step of opening the program file.

12. A method for measuring workpieces, the method comprising:
   measuring a workpiece;
   recording measuring procedures of the workpiece;
   generating procedure codes according to the measuring procedures;
   storing the procedure codes in a program file;
   opening the program file;
   saving the program file in a text file;
   reading a procedure of the text file;
   determining whether the procedure complies in syntax;
   converting the text file into corresponding procedure commands if the procedure complies in syntax;
   saving the procedure commands in a measuring program command package; and
   measuring a same type of workpiece by executing the procedure commands of the measuring program command package.

13. The method according to claim 12, further comprising:
   determining whether all the procedures of the text file have been read;
   ending the process if all the procedures of the text file have been read; and
   returning to the step of reading a procedure of the text file if all the procedures of the text file have not been read.

14. The method according to claim 12, further comprising:
   reminding an error and modifying the error if the procedure does not comply in syntax; and
   saving the procedure in the text file, and returning to the step of opening the program file.

15. The method according to claim 12, wherein the measuring procedures comprise a find edge tool, a focus tool, measuring elements, and constructive elements and coordinates.

16. The method according to claim 13, wherein the step of generating procedure codes comprises:
   obtaining command parameters of the measuring procedures;
   determining whether the command parameters are accurate;
   generating procedure codes based on the command parameters and recording the procedure codes in a program file if the command parameters are accurate;
   determining whether the recording of the procedure codes has been finished;
   saving the program file if the recording of the procedure codes has been finished; and
   returning to the step of obtaining the command parameters of the measuring procedures if the recording of the procedure codes has not been finished.

17. The method according to claim 16, further comprising:
   returning to the step of obtaining the command parameters if the command parameters are inaccurate.

* * * * *